US012726238B2

(12) United States Patent
Kim et al.

(10) Patent No.: US 12,726,238 B2
(45) Date of Patent: Sep. 1, 2026

(54) COMMUNICATION METHOD USING BEAM STEERING APPARATUS COMPRISING META-SURFACE

(71) Applicant: KOREA ADVANCED INSTITUTE OF SCIENCE AND TECHNOLOGY, Daejeon (KR)

(72) Inventors: Song Min Kim, Daejeon (KR); Nam Jo Ahn, Daejeon (KR); Min Seok Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 305 days.

(21) Appl. No.: 18/397,591

(22) Filed: Dec. 27, 2023

(65) Prior Publication Data

US 2025/0202537 A1 Jun. 19, 2025

(30) Foreign Application Priority Data

Dec. 19, 2023 (KR) ........................ 10-2023-0186236

(51) Int. Cl.

| | |
|---|---|
| ***H04B 7/04*** | (2017.01) |
| ***H04B 7/0408*** | (2017.01) |
| ***H04B 7/06*** | (2006.01) |
| ***H04B 7/145*** | (2006.01) |

(52) U.S. Cl.

CPC ....... *H04B 7/04013* (2023.05); *H04B 7/0408* (2013.01); *H04B 7/06952* (2023.05); *H04B 7/145* (2013.01)

(58) Field of Classification Search

CPC .............. H04B 7/04013; H04B 7/0408; H04B 7/06952; H04B 7/145; H04W 56/00

See application file for complete search history.

(56) References Cited

U.S. PATENT DOCUMENTS

2023/0063645 A1* 3/2023 Gurelli .................. H04B 7/145
2024/0187078 A1* 6/2024 Gaal .................. H04B 7/06952

FOREIGN PATENT DOCUMENTS

KR 10-2023-0155450 A 11/2023
KR 10-2023-0167004 A 12/2023

OTHER PUBLICATIONS

Korean Office Action for related KR Application No. 10-2023-0186236 mailed Jan. 2, 2026 from Korean Intellectual Property Office.

* cited by examiner

*Primary Examiner* — Ayodeji O Ayotunde

(74) *Attorney, Agent, or Firm* — Paratus Law Group, PLLC

(57) ABSTRACT

Disclosed is a communication method using a meta-surface, the communication method including providing, by a base station, a control signal to a beam steering apparatus including a reconfigurable meta-surface; performing, by the beam steering apparatus, time synchronization with the base station by using the control signal; performing, by the beam steering apparatus, beam sweeping with a plurality of different beams formed by reconfiguring the meta-surface; and performing communication, by a user terminal, with the base station by using one of the plurality of beams swept by the beam steering apparatus, wherein the time synchronization, the beam sweeping, and the communication may be performed periodically.

10 Claims, 16 Drawing Sheets

Figure 1:
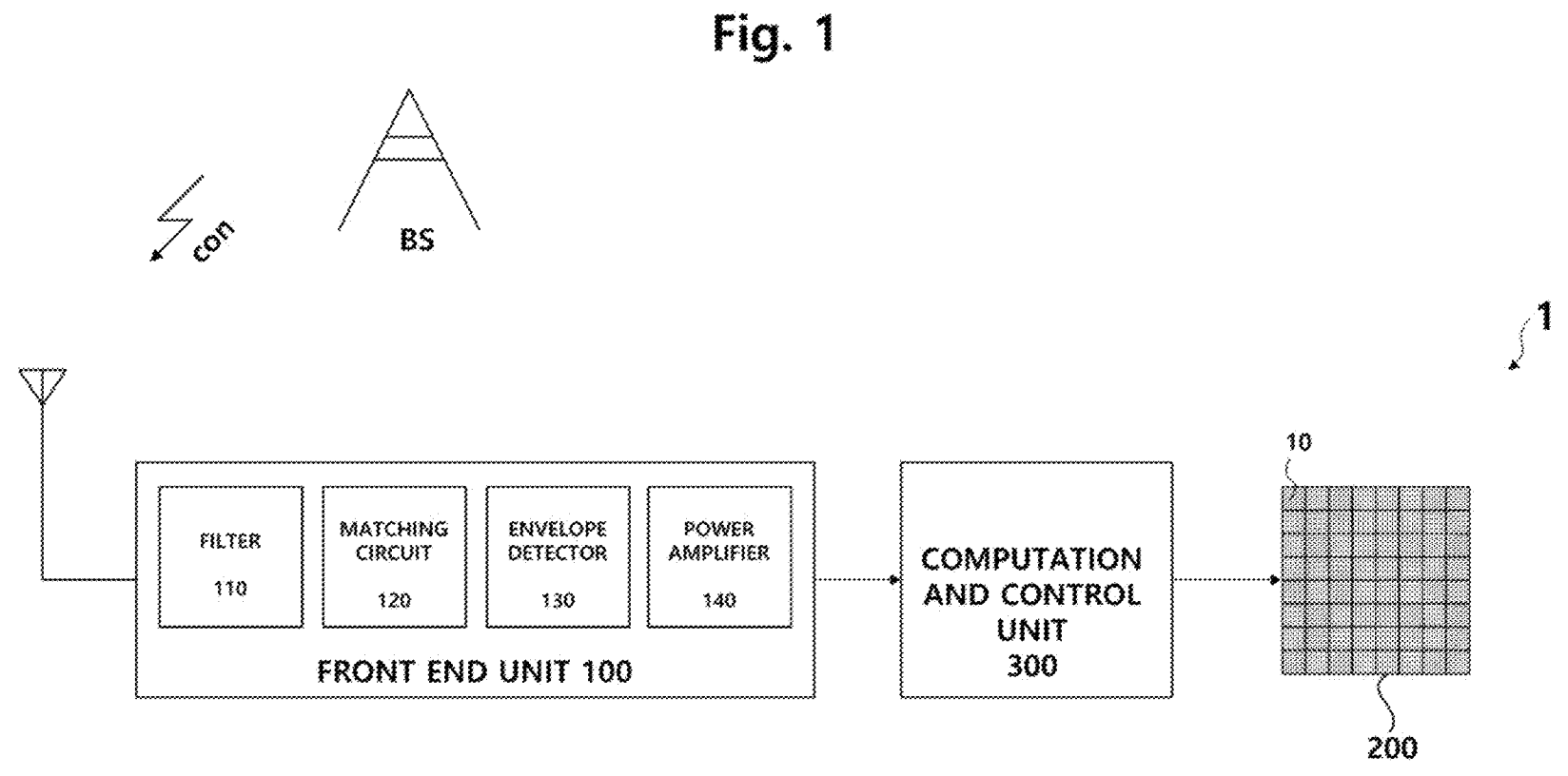

COMPUTATION AND CONTROL UNIT 300

FRONT END UNIT 100

FILTER 110

MATCHING CIRCUIT 120

ENVELOPE DETECTOR 130

POWER AMPLIFIER 140

BS

Con

Fig. 2A
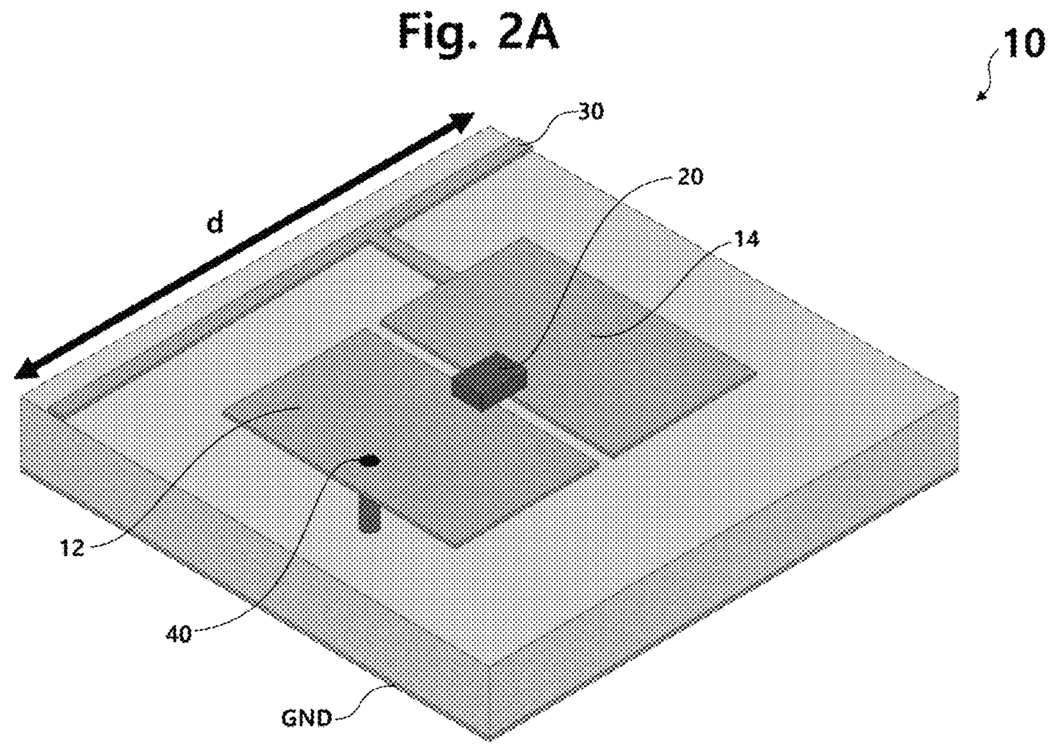
Fig. 2B
Fig. 2C
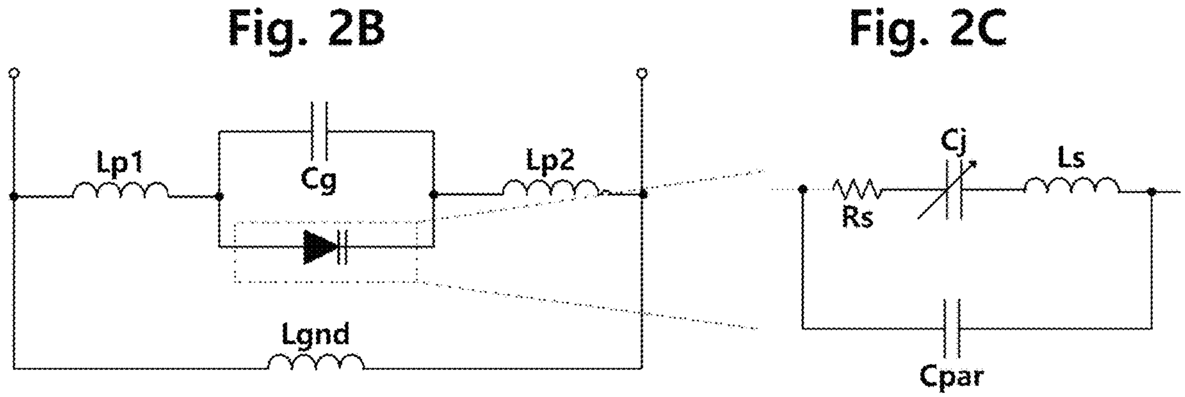

IFFT & up-convert
NB-IoT Downlink Channel
Y'
Rate Matching/ Scrambling
Y
Channel Coding (1/3 rate)
X
CRC attachment
Payload bits
Tx chain
Reverse Engineering

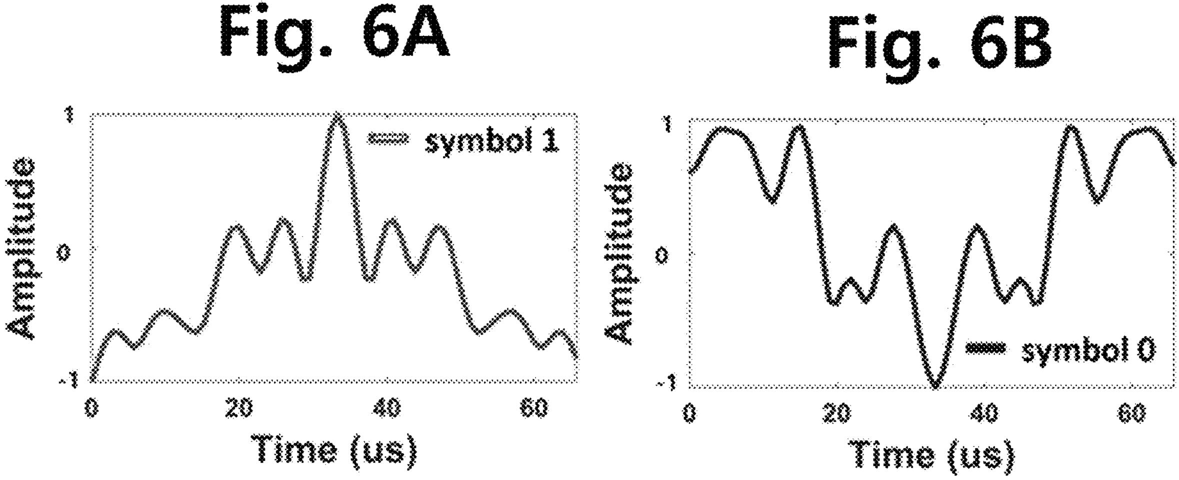
Fig. 6A
symbol 1
Amplitude
1
0
-1
0
20
40
60
Time (us)
Fig. 6B
symbol 0
Amplitude
1
0
-1
0
20
40
60
Time (us)
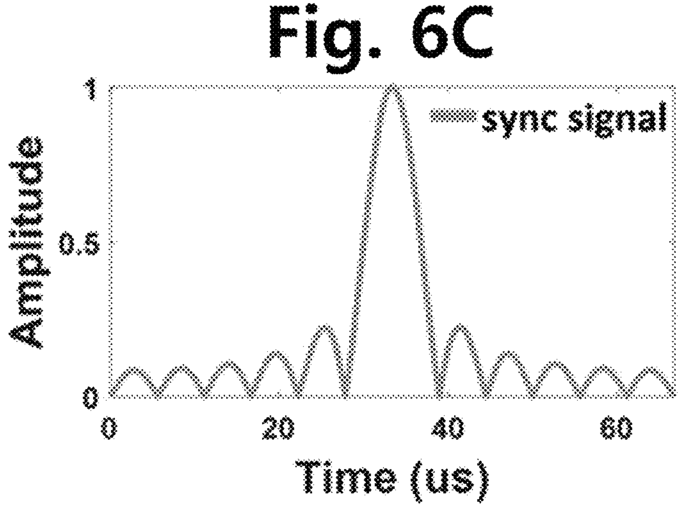
Fig. 6C
sync signal
Amplitude
1
0.5
0
0
20
40
60
Time (us)

Fig. 7

PROVIDE, BY BASE STATION, CONTROL SIGNAL TO BEAM STEERING APPARATUS INCLUDING RECONFIGURABLE META-SURFACE — S100

PERFORM, BY BEAM STEERING APPARATUS, TIME SYNCHRONIZATION WITH BASE STATION BY USING CONTROL SIGNAL — S200

PERFORM, BY BEAM STEERING APPARATUS, BEAM SWEEPING WITH PLURALITY OF DIFFERENT BEAMS FORMED BY RECONFIGURING META-SURFACE — S300

PERFORM COMMUNICATION, BY USER TERMINAL, WITH BASE STATION BY USING ONE OF PLURALITY OF BEAMS SWEPT BY BEAM STEERING APPARATUS — S400

END

Fig. 8
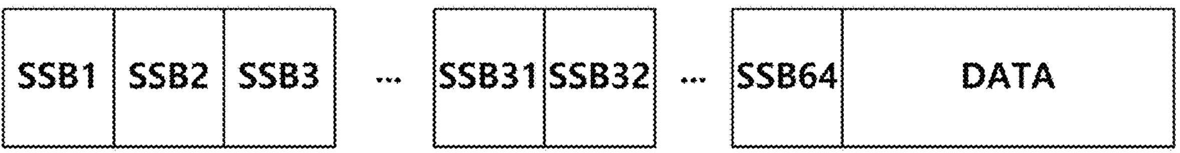
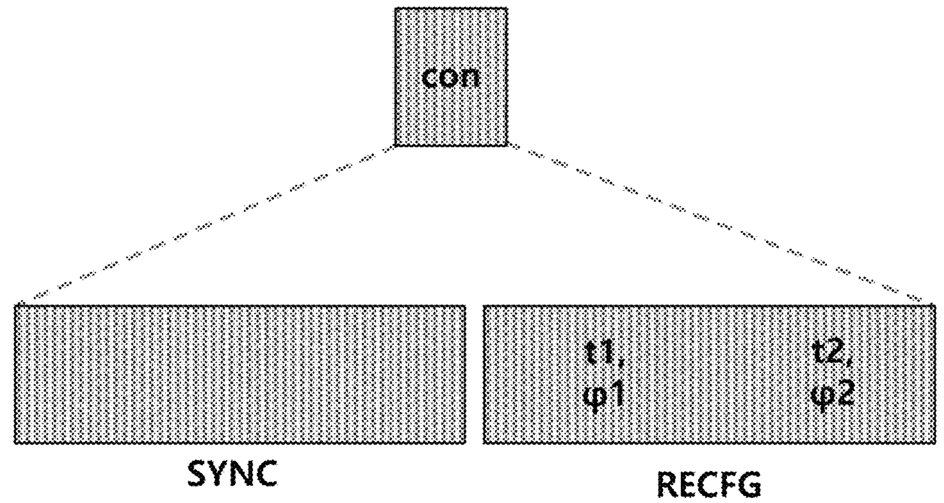

Sync 1
Sync 2
Sync 3
Sync 4
Sync 5
t
t+T
t+2T
t+3T
t+4T
time

Samples
Windowed Symbol
Matched filter
Mag
threshold
time

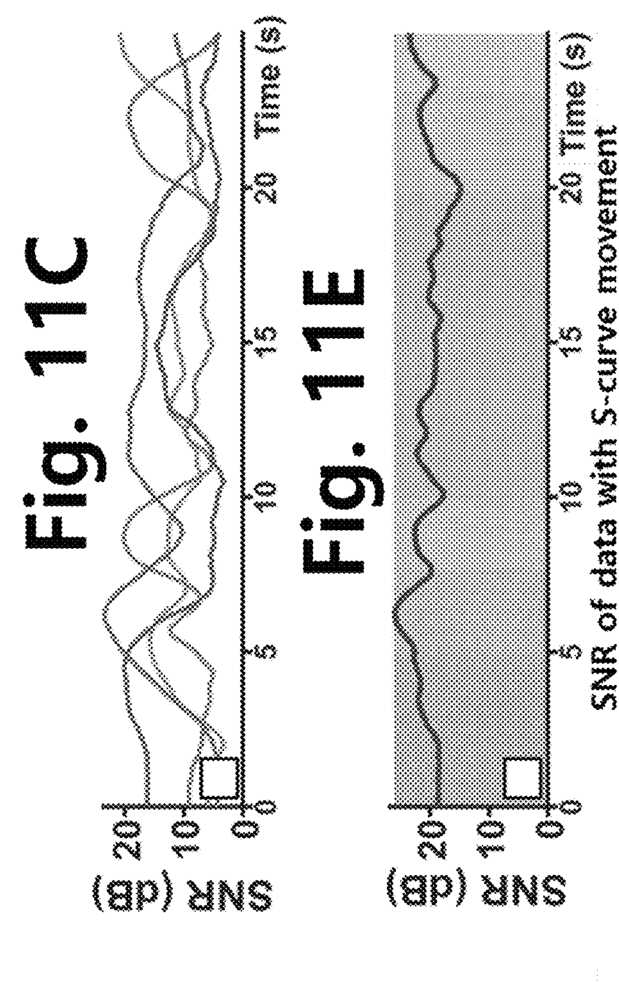
Fig. 11A
Fig. 11C
Fig. 11E
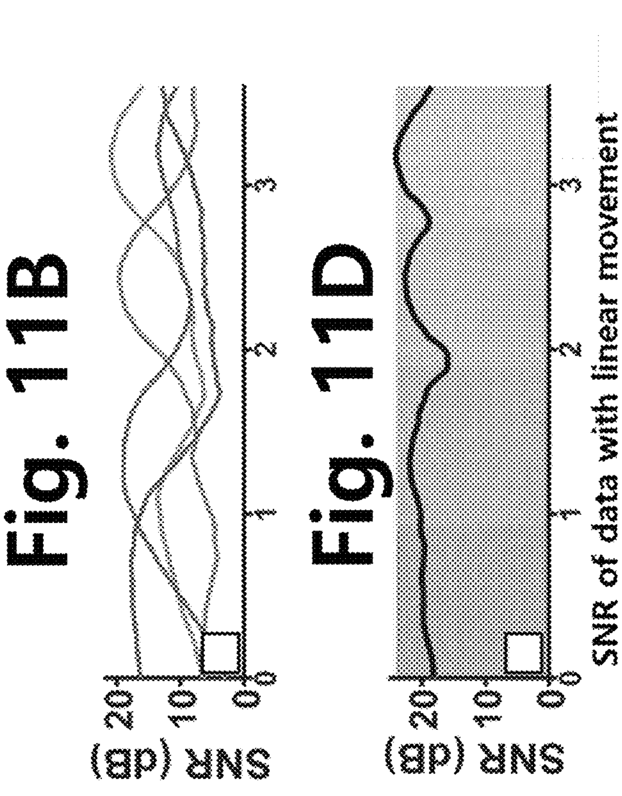
Fig. 11B
Fig. 11D

COMMUNICATION METHOD USING BEAM STEERING APPARATUS COMPRISING META-SURFACE

CROSS-REFERENCE TO PRIOR APPLICATION

This Application claims priority to Korean Patent Application No. 10-2023-0186232 (filed on Dec. 19, 2023), which is hereby incorporated by reference in its entirety.

BACKGROUND

The present invention relates to a communication method using a beam steering apparatus comprising a meta-surface.

As mobile data exponentially increases in 5G and 6G cellular services, millimeter-wave (mmWave) is a key technology to overcome the spectrum shortage below the 6 GHz band and advance toward enhanced mobile broadband (eMBB), and provides abundant bandwidth across multi-GHz frequencies. However, mmWave communication needs to overcome technical obstacles such as path loss. Especially in complex indoor environments with numerous obstacles, coverage may be limited and reliability for mobile users may be impaired. To address this, various approaches have been introduced, including high-density deployment of base stations (BS), relays, and distributed antennas. Simply installing large number of expensive transceivers is an obstacle to the adoption and expansion of mmWave technology.

Meanwhile, meta-surfaces are emerging as an economical solution for extending mmWave coverage. Various designs, such as reconfigurable meta-surfaces adaptable to different channels and user mobility, as well as low-cost 3D printing meta-surfaces, have been introduced, and are generally designed to operate by passively reflecting base station (BS) signals without an RF chain for signal generation.

SUMMARY

According to another aspect of the present invention, there is provided a communication method using a meta-surface, the communication method including: providing, by a base station, a control signal to a beam steering apparatus including a reconfigurable meta-surface; performing, by the beam steering apparatus, time synchronization with the base station by using the control signal; performing, by the beam steering apparatus, beam sweeping with a plurality of different beams formed by reconfiguring the meta-surface; and performing communication, by a user terminal, with the base station by using one of the plurality of beams swept by the beam steering apparatus, wherein the time synchronization, the beam sweeping, and the communication may be performed periodically.

According to an embodiment of the present invention, the control signal may include a synchronization field for time synchronization and a reconfiguration field for reconfiguring the meta-surface of the beam steering apparatus.

According to an embodiment of the present invention, the control signal may be a signal according to a narrow band Internet of Things (NB-IoT) protocol and is a signal emulated with binary phase shift keying (BPSK).

According to an embodiment of the present invention, the performing of the time synchronization may include forming, by the beam steering apparatus, an envelope of the synchronization field, and sampling, by the beam steering apparatus, the envelope, wherein the forming of the envelope and the sampling of the envelope may be performed in pairs, and the envelope may be sampled at a different time point for each pair.

According to an embodiment of the present invention, upon initial boot-up of the beam steering apparatus, the performing of the time synchronization may include sampling the entire synchronization field.

According to an embodiment of the present invention, upon subsequent boot-up of the beam steering apparatus, the performing of the time synchronization may include sampling the highest power portion of the synchronization field.

According to an embodiment of the present invention, the communication method may further include reporting, by the user terminal, a synchronization signal block (SSB) of the beam received with the highest power among the plurality of beams swept and provided by the beam steering apparatus and the base station to the base station, after the performing of the beam sweeping.

According to an embodiment of the present invention, the reconfiguration field may correspond to information of the beam received with the highest power in the previous performing of the beam sweeping.

According to an embodiment of the present invention, the communication method may further include performing, by the base station, beam sweeping by forming different synchronization signal blocks (SSBs) for each of the plurality of different beams, wherein, in the performing of the beam sweeping by the base station, the beam steering apparatus may not perform beam steering.

According to an embodiment of the present invention, in the performing of the beam sweeping, the base station may provide the beam at the same angle, and the beam steering apparatus may perform beam sweeping by forming different synchronization signal blocks (SSBs) while reflecting the beam provided by the base station in different directions.

According to an embodiment of the present invention, the providing of the control signal may be conducted using a 5G FR1 band of less than 6 GHz, and the performing of the communication may be conducted using a 5G FR2 band of a mm wave band.

As described above, according to the present invention, a user terminal can perform communication smoothly with significantly low power consumption in an environment where obstacles are located.

BRIEF DESCRIPTION OF THE DRAWINGS

FIG. 1 is a block diagram illustrating an outline of a beam steering apparatus according to an embodiment.

FIG. 2A is a schematic diagram illustrating an outline of a unit cell according to the present invention, FIG. 2B is an equivalent circuit diagram illustrating a unit cell according to the present invention, and FIG. 2C is an equivalent circuit diagram illustrating a variable capacitance element according to the present invention.

FIGS. 6A-6C illustrate symbols of a control signal formed by emulating BPSK by reverse engineering.

FIG. 7 illustrates an outline of a communication method.

FIG. 8 is a schematic diagram illustrating the structure of a beam management signal provided by a base station to a beam steering apparatus.

FIG. 11A is a diagram illustrating an experimental environment, FIGS. 11B and 11C illustrate dynamic SNR changes of four beams according to movement measured once every frame (20 ms) for "linear" and "S-curve" movement paths, respectively, and FIGS. 11D and 11E are diagrams illustrating SNR of data in every frame for "linear" and "S-curve" movement paths, respectively.

DETAILED DESCRIPTION

Figure 3:
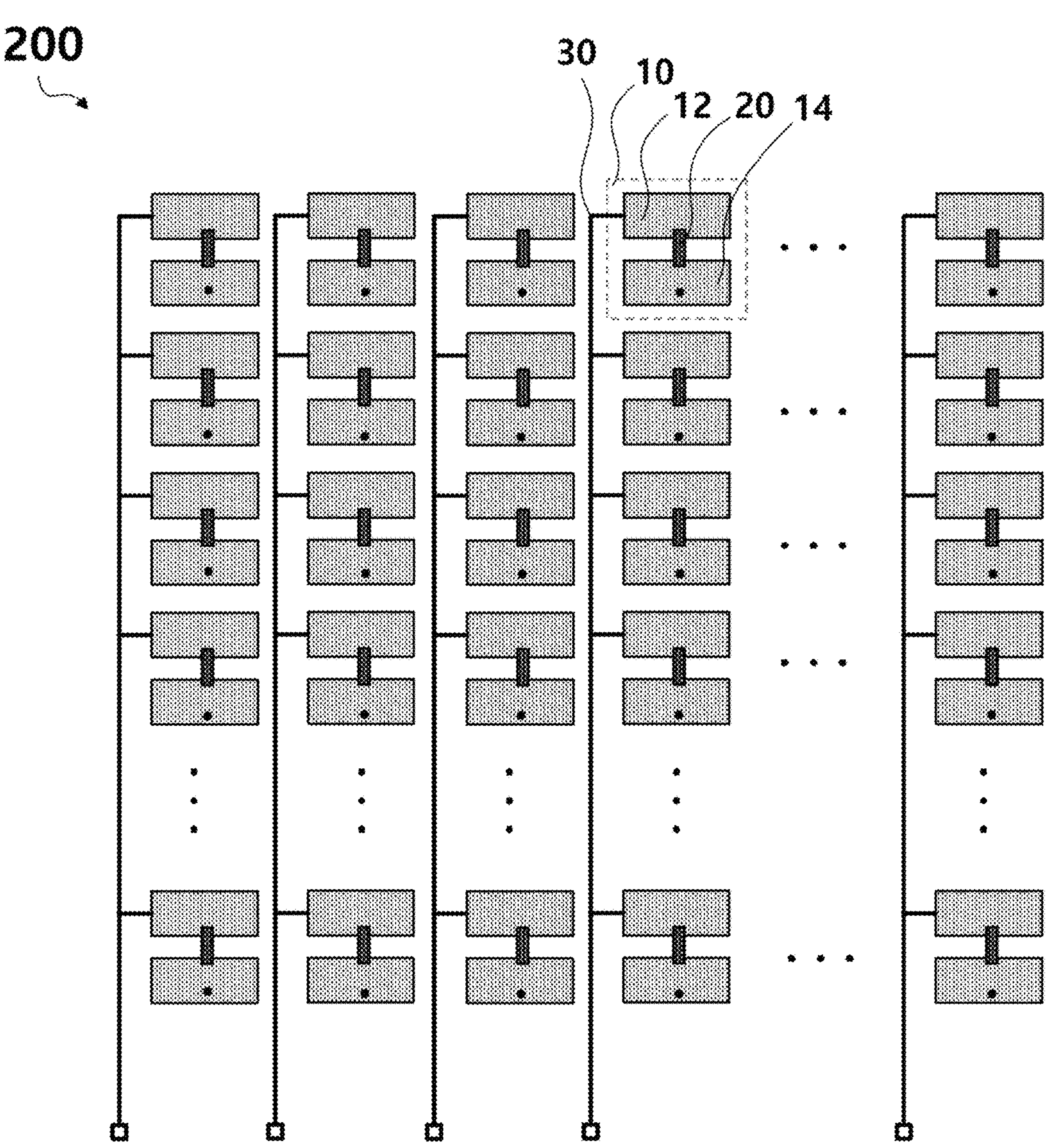
FIG. 3 is a diagram schematically illustrating a meta-surface 200 in which unit cells are arranged in an array.

Hereinafter, an embodiment of the present invention will be described with reference to the accompanying drawings. FIG. 1 is a block diagram illustrating an outline of a beam steering apparatus according to an embodiment. FIG. 2A is a schematic diagram illustrating an outline of a unit cell according to the present invention, FIG. 2B is a circuit diagram illustrating an equivalent circuit of a unit cell according to the present invention, and FIG. 2C is an equivalent circuit diagram illustrating a variable capacitance element according to the present invention. FIG. 3 is a diagram schematically illustrating a meta-surface 200 in which unit cells are arranged in an array. Referring to FIGS. 1 to 3, a beam steering apparatus 1 according to an embodiment of the present invention may include a front end unit 100 configured to receive a control signal con from a base station (BS); a meta-surface 200 with controllable unit cells 10 arranged in an array, the unit cells 10 including metal plates 12 and 14 spaced apart from each other, a variable capacitance element 20 connected between the metal plates 12 and 14, and a line 30 to which a meta-surface control signal is provided; and a computation and control unit 300 configured to generate a meta-surface control signal for controlling the meta-surface 200 according to the control signal wherein the beam reflected from the meta-surface 200 is steered according to the control signal.

For example, the meta-surface 200 may include a plurality of unit cells 10 arranged 16×16. However, the number and arrangement of unit cells 10 constituting the meta-surface 200 may vary depending on the embodiment. Each of the unit cells 10 constituting the meta-surface 200 includes the metal plates 12 and 14 spaced apart from each other. In an embodiment, the metal plates 12 and 14 may be manufactured from a substrate RO4003C with a thickness of 32 mil. A ground plane GND and the metal plates 12 and 14 may be separated by a dielectric material with $\varepsilon r=3.55$. In an embodiment, the unit cells 10 may have rectangular shapes, and a length d of one side thereof may be ½ of the wavelength to be reflected.

One metal plate 14 may be connected to the line 30, and the other metal plate 12 may be connected to the ground plane GND through a via 40. The line 30 may be connected to the unit cells 10 included in a predetermined region. Accordingly, the same meta-surface control signal may be provided to the unit cells 10 included in the predetermined region so that the unit cells 10 may be controlled together. In the embodiment illustrated in FIG. 3, the line 30 is connected to the unit cells 10 included in the same line, and the same meta-surface control signal is provided to the unit cells 10 included in the same line. As illustrated in FIG. 3, the other end of the line is connected to a general-purpose I/O (GPIO) to allow the meta-surface control signal to be provided.

FIG. 2B is an equivalent circuit diagram illustrating the unit cell 10 illustrated in FIG. 2A, and FIG. 2C is an equivalent circuit diagram illustrating a varactor diode when the variable capacitance element 20 is implemented as the varactor diode. Referring to FIGS. 2A to 2C, the two metal plates 12 and 14 spaced apart from each other equivalently form a capacitor Cg. In addition, the metal plates 12 and 14 may be modeled as inductance components Lp1 and Lp2, respectively. In addition, the ground plane GND may also be modeled as an inductance component Lgnd.

The metal plates 12 and 14 are electrically connected to each other through the variable capacitance element 20. In an embodiment, the variable capacitance element 20 is the varactor diode, and a junction capacitance (Cj) between two electrodes changes as a depletion region of the diode changes according to the voltage between the two metal plates 12 and 14, whereby the equivalent capacitance changes and the electrical impedance of the unit cell changes.

A reflection coefficient F of this unit cell 10 is calculated according to the following equation.

$$\Gamma = \frac{Z_L - Z_0}{Z_L + Z_0} \quad \text{[Equation 1]}$$

($Z_L$: impedance of unit cell, $Z_O$: impedance of medium)

The impedance of the unit cell 10 and the impedance of the medium are both complex numbers. Therefore, when the impedance of the unit cell 10 changes, the phase of the reflection coefficient F ultimately changes, whereby the phase of the radio waves reflected from the unit cell 10 changes.

Figure 4:
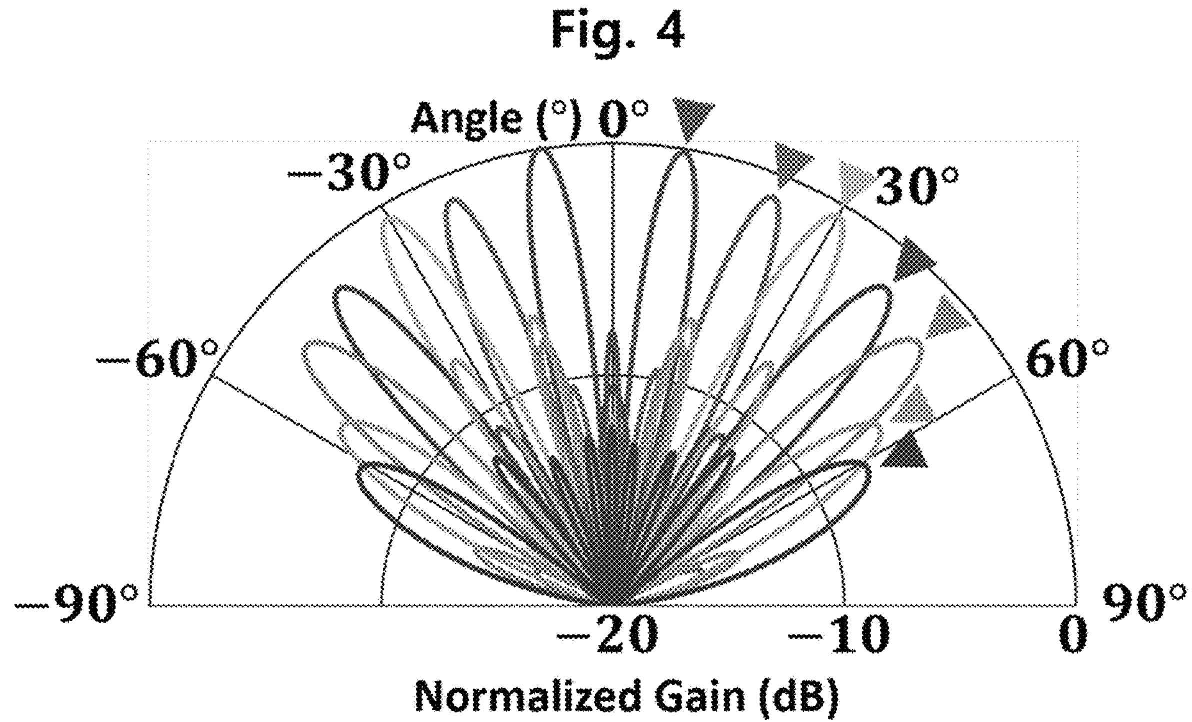
FIG. 4 is a diagram illustrating an angle of a beam formed by a meta-surface control signal provided by a computation and control unit to a line through a general-purpose I/O.

FIG. 4 is a diagram illustrating an angle of a beam that is controlled by the meta-surface control signal provided by the computation and control unit 300 to the line 30 through a general-purpose I/O (GPIO) and reflected by the beam steering apparatus 1. Referring to FIGS. 1 to 4, the computation and control unit 300 decodes a control signal con received by the front end unit 100 and generates a meta-surface control signal.

Communication data between a base station BS and a user terminal UE is transmitted in a 5G FR2 band of a mm wave band, and the control signal con between the base station BS and the beam steering apparatus 1 is transmitted in a FR1 band of less than 6 GHz which is a lower frequency than the 5G FR2 band.

However, in order to fully sample the signal in the FR1 band, an ADC capable of sampling the signal at a frequency corresponding to the band is required, but this ADC consumes much power compared to the power budget. Therefore, in order to reduce the power consumption of the beam steering apparatus 1, the base station BS emulates and transmits a signal according to the NB-IoT protocol as a BPSK signal in a 14 kHz band, and the beam steering apparatus 1 samples and decodes data with an operating frequency of 14 kHz.

Figure 5:
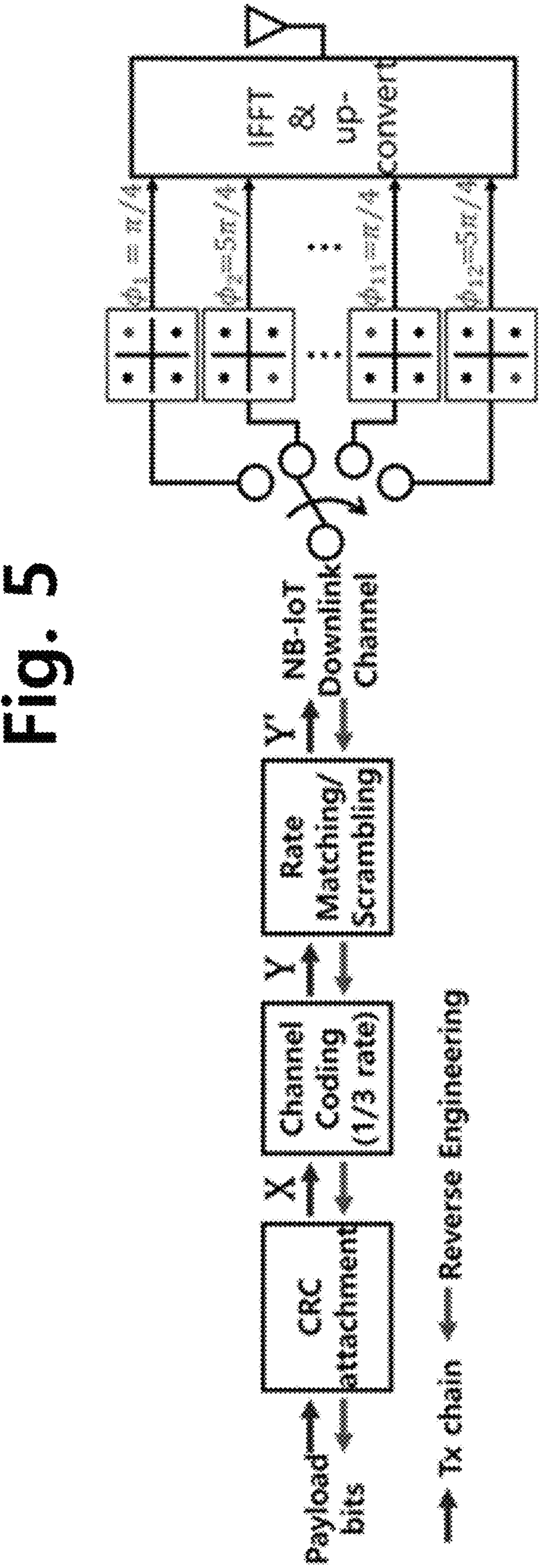
FIG. 5 is a diagram illustrating an encoding mechanism and a reverse engineering mechanism of an NB-IoT protocol in 5th generation mobile communication.

FIG. 5 is a diagram illustrating an encoding mechanism and a reverse engineering mechanism of an NB-IoT protocol in 5th generation mobile communication. OFDM emulation outputs two coded bits per subcarrier, and in the 5th generation mobile communication, a subcarrier on which data is encoded is called a resource element. Each resource element corresponds to 4 QAM points. There are 480 resource elements in one downlink signal NPDSCH of a transmitter configured with 3 ms downlink NB-IoT. The 480 resource elements are converted to a total of 960 (=480*2 bits/resource element) coded bits, denoted as Y'. Reverse engineering indicated by a red arrow in FIG. 7 is to find a pre-coded bit sequence X generated through NB-IoT encoding indicated by a blue arrow. In other words, by calculating X for the given Y', rate matching, scrambling, and channel coding are reversely engineered. The number of bits utilized in the bit sequence X that generates Y' is 280 bits which is a predefined length in mobile communication.

The coded bits of Y are a total of 840 coded bits, and are generated from 280 bits of X and a ⅓ code rate. Y can be obtained by multiplying X by M matrix, which is Galois finite field matrix (GF (2)). NB-IoT channel coding is expressed through the equation Y=M*X. M is an 840×280 matrix. A total of 240 bits out of 840 bits of Y are selected to emulate a BPSK signal. When a 240-bit sub-vector is called $Y_{240}$ and the corresponding M matrix is called $M_{240}$, $Y_{240}=M_{240}X$. As a result, the $M_{240}$ matrix is a standard-based full rank matrix, whereby there are various solutions for X that satisfy $Y_{240}$, and X can be obtained in consideration of channel coding when Y is given.

One method for finding X that satisfies this among various solutions is as follows. Among the 840 output bits of Y, 256 bits including the previously selected 240 bits are selected and called $Y_{256}$, and the corresponding M matrix is called $M_{256}$. At this time, $M_{256}$ is selected to be a full rank. Similar to the above description, $M_{256}X=Y_{256}$. $M_{256}$ is a full rank and is a square matrix, whereby an inverse matrix exists. Therefore, since $X=(M_{256})^{\wedge}(-1)Y_{256}$, X can be obtained.

To obtain Y from Y', reverse engineering of scrambling and rate matching is required. This utilizes the characteristics of scrambling and rate matching, which enable one-to-one mapping. In other words, when Y' is known, Y can be obtained immediately through a reverse one-to-one mapping process.

In this manner, symbols of a reconfiguration field RECFG, which is included in the control signal con emulated with BPSK through reverse engineering and transmits information that can reconfigure a meta-surface, are as shown in FIGS. 6A-6C, and it can be seen that a difference in the phases of the two symbols is 180 degrees. The computation and control unit 300 may decode the control signal con provided from the base station BS into BPSK to generate a meta-surface control signal.

The computation and control unit 300 provides a meta-surface control signal through the line 30 connected to a GPIO. As described above, the same meta-surface control signal is provided for each pre-divided region on the meta-surface 200. As an example, the pre-divided region as illustrated in FIG. 3 may be the same line of the array of the unit cells 10 constituting the meta-surface 200.

In an embodiment, two control signals, logic 1 and logic 0, may be provided to the array of the unit cell 10. For example, logic 1 may be a voltage signal of 3.3 V, and logic 0 may be a voltage signal of 0 V. As another example, logic 1 may be a voltage signal of 0 V, and logic 0 may be a voltage signal of 3.3 V.

Depending on a combination of logic 1 and logic 0 control signals provided to the array of the unit cells 10, the signal reflected from each unit cell 10 has no phase difference or a significantly small phase difference when viewed at a specific angle, resulting in constructive interference. When viewed at angles other than the specific angle, the phase difference may be up to 180 degrees, resulting in destructive interference.

Therefore, by providing the control signal consisting of logic 1 and logic 0 to the array of the unit cells 10, different constructive interference and destructive interference may occur at each angle, and the reflection of incident beams relative to the normal line of the meta-surface 200 may be steered as illustrated in FIG. 4.

Less than 10 ns may be required to reconfigure the meta-surface 200 as a whole. This is due to the fact that a time constant value is RsCj<3 ps when the variable capacitance element is implemented as a varactor diode. Therefore, most controllers may complete reconfiguration within a single clock cycle at low power. In addition, the amount of energy consumed by the diode is only up to 12 pJ during a single reconfiguration, thereby enabling low-power reconfiguration by reducing energy consumption during reconfiguration.

Hereinafter, a communication method using the meta-surface 200 will be described with reference to FIGS. 7 to 10. FIG. 7 is a diagram illustrating an outline of a communication method. Referring to FIG. 7, the communication method includes providing, by a base station BS, a control signal con to a beam steering apparatus 1 including a reconfigurable meta-surface 200 (S100); performing, by the beam steering apparatus 1, time synchronization with the base station by using the control signal con (S200); performing, by the beam steering apparatus 1, beam sweeping with a plurality of different beams formed by reconfiguring the meta-surface 200 (S300); and performing communication, by a user terminal UE, with the base station BS by using one of the plurality of beams swept by the beam steering apparatus 1 (S400), wherein the performing of the time synchronization may be performed periodically.

FIG. 8 is a schematic diagram illustrating the structure of a signal provided by the base station BS to the beam steering apparatus 1. Referring to FIG. 8, the base station BS provides a control signal con, an SSB field SSB, and a data field DATA (S100). The control signal con contains information including directions (ϕ1, ϕ2, . . . ) and times (t1, t2, . . . ) at which the meta-surface will steer beams for the next 20 msec. The synchronization signal block SSB field includes a plurality of SSB signals SSB1, SSB2, . . . , SSB64 containing beam information such as the beam steering angle provided by the base station BS and the beam steering apparatus 1. The data field DATA includes data that is communicated with the user terminal through the base station BS and the beam steering apparatus 1.

In an embodiment, the SSB field SSB and the data field DATA have a total time duration of 20 msec, and transmission of the SSB field SSB and data field DATA is periodically repeated every 20 msec. In an embodiment, both the SSB field SSB and the data field DATA may be transmitted in a 5G FR2 band of the mm wave band.

The control signal con includes a synchronization field SYNC for performing time synchronization between the beam steering apparatus 1 and the base station BS, and a reconfiguration field RECFG corresponding to information such as the steering angle of the beam steered by the beam steering apparatus 1. In an embodiment, the control signal con may be transmitted during transmission of the SSB field SSB and the data field DATA, and may have a length of up to 10 msec. The control signal con is transmitted periodically, and as described above, the time synchronization is also performed periodically.

Figure 9:
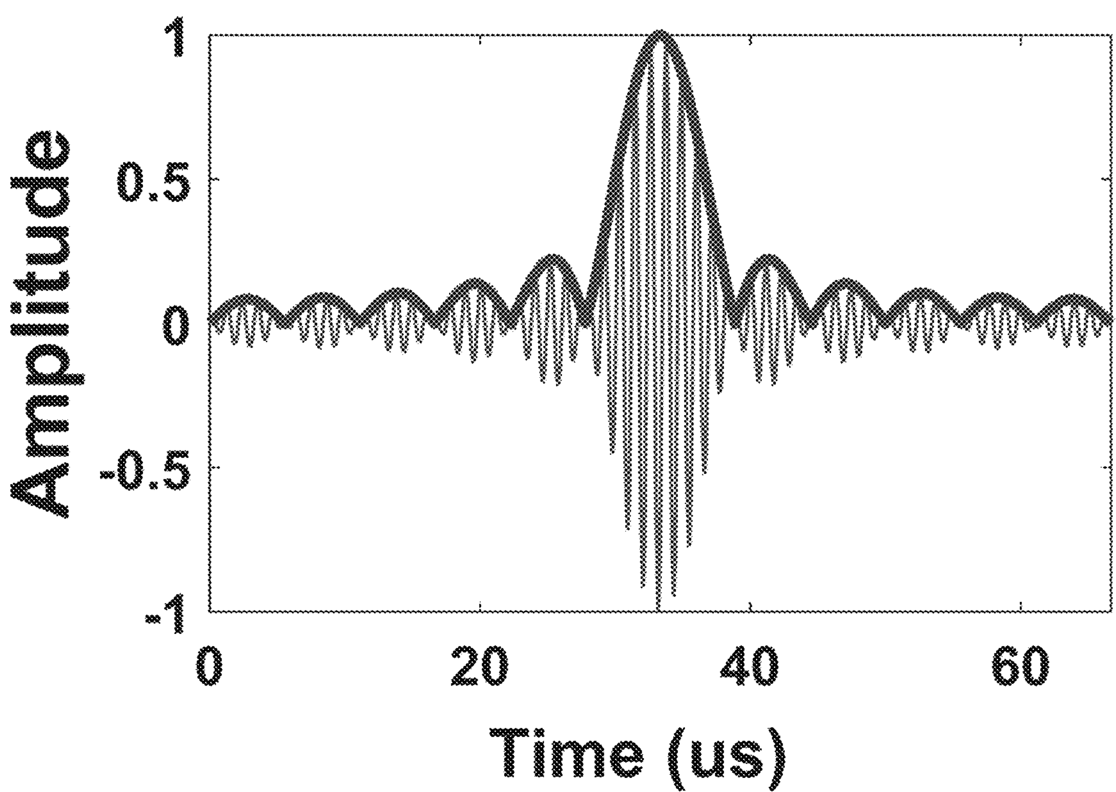
FIG. 9 is a diagram illustrating an outline of a synchronization field.

The beam steering apparatus 1 performs time synchronization with the base station BS using the control signal con (S200). FIG. 9 is a diagram illustrating an outline of a synchronization field SYNC. Referring to FIGS. 1 and 9, the synchronization field SYNC is transmitted in a 5G FR1 band below 6 GHz. The synchronization field SYNC input to a filter 110 of the beam steering apparatus 1 outputs only a signal in a band corresponding to a pass band. As an example, the filter 110 is a band pass filter BPF, with a center frequency of 915 MHz, a −3 dB bandwidth of 320 kHz, and high selectivity of a sharpness (Q factor) value of about 8000.

The signal output from the filter 110 is provided to an envelope detector 130 through a matching circuit 120 for impedance matching. As shown in FIG. 9, the front end unit 100 of this embodiment detects the envelope using the envelope detector 130 without using components such as a mixer for down conversion. This provides the advantage of being able to form the envelope of the signal with low power consumption.

The power amplifier 140 amplifies and outputs the signal output from the envelope detector 130. In an embodiment, the power amplifier 140 may amplify a signal by connecting two or more power amplifiers in a cascade manner. In addition, as will be described later, the driving power of the power amplifier 140 is cut off while the power amplifier 140 is not operating, thereby reducing power consumption. The envelope of the synchronization signal amplified and output by the power amplifier 140 is as shown by a thick solid line in FIG. 6B and FIG. 9.

Figures 10A, 10B:
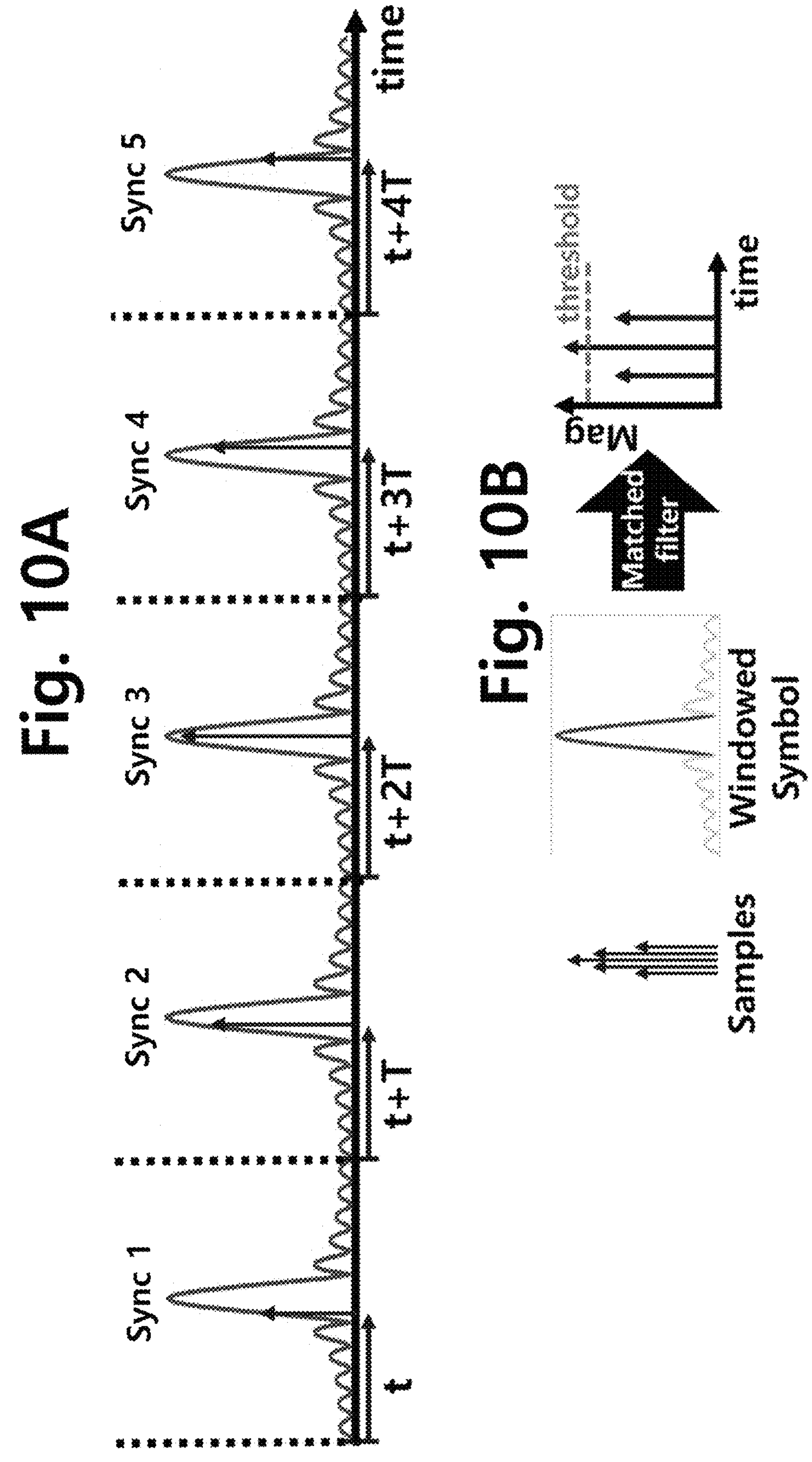
FIGS. 10A to 10B are diagrams schematically illustrating a process of performing time synchronization using a synchronization field (SYNC).

FIGS. 10A to 10B are diagrams schematically illustrating a process of performing time synchronization using a synchronization field SYNC. Time synchronization may be performed using a plurality of synchronization fields provided by a base station BS.

Referring to FIG. 1 and FIG. 10A, the base station BS provides a control signal including a sync symbol at a predetermined period. In the illustrated example, the base station BS provides five sync symbols Sync 1, Sync 2, Sync 3, Sync 4, and Sync 5. The computation and control unit 300 samples the envelope of the input sync symbol with a predetermined time difference T.

The sampled values form a window for a portion with the highest power in the sync symbol, matched filtering is performed as illustrated in FIG. 10B, and the sampled values exceeding a threshold are selected and used to perform time synchronization between the base station BS and the beam steering apparatus 1.

In an embodiment, a new radio (NR) standard using mm waves requires 260 ns synchronization accuracy. To meet this, a sampling frequency of 3.84 MHz is required. However, an ADC that samples a corresponding signal at the sampling frequency of 3.84 MHz consumes mW levels of power when operating. In this embodiment, when a plurality of sync symbols are continuously input, a single sample is obtained per symbol (14 KHz sampling rate). By applying an offset of T=260 ns between the successive samples, five samples with an interval of T=260 ns may be obtained while using a 14 KHz ADC. Therefore, it is possible to emulate a 3.84 MHz ADC and reduce the ADC power consumption by a factor of up to 274.

In addition, according to this embodiment, matching filtering is performed only on the portion (center 780 ns during a 66.7 μs symbol duration) with the highest power in the sync symbol, thereby significantly reducing calculation and energy consumption.

However, during the initial operation of the beam steering apparatus 1, all sections of the sync symbol may be sampled to search for the portion with the highest power, and in the subsequent synchronization process, synchronization may be performed by sampling the portion with the highest power in the sync symbol from the search results.

The control signal con may be transmitted in the 5G FR1 band below 6 GHz. The control signal con is a signal that complies with the NB-IoT protocol and is transmitted by emulating a BPSK symbol so that a BPSK receiver of the beam steering apparatus 1 can decode the signal. Accordingly, the beam steering apparatus 1 may decode the received control signal con into BPSK, and obtain information included in a reconfiguration field RECFG provided by the base station BS from the decoded signal.

In an embodiment, the reconfiguration field RECFG may include information such as the steering angle of the beam reflected by the beam steering apparatus 1, and information on the beam that was received at the maximum power reported by the user terminal to the base station BS in the performing of the beam sweeping (S300). The beam steering apparatus 1 provided with the reconfiguration field RECFG may control the meta-surface 200 to correspond to the beam information included in the reconfiguration field RECFG.

In an embodiment, when the beam steering apparatus 1 is arranged and initially operates, the steering angle of the beam provided by the base station BS through beam sweeping and the steering angle of the beam reflected by the beam steering apparatus 1 may each be configured and provided to the base station BS, and the base station BS may store the steering angles.

For example, when the base station BS performs beam sweeping and provides the beam at different steering angles, the information on the beam including each steering angle may be configured in the base station BS to be provided to SSB1 to SSB61. In addition, when the beam steering apparatus 1 reflects the beam provided by the base station BS at different steering angles and performs beam sweeping, the information about the beam including each steering angle may be configured in the beam steering apparatus 1 and the base station BS to be provided to SSB62 to SSB64.

In an embodiment, when the beam steering apparatus 1 performs beam sweeping by reflecting the beam at different steering angles, the base station BS provides the steering angle of the beam without changing the steering angle of the beam while the beam steering apparatus 1 steers and provides the beam. The user equipment UE receives the beam provided by the base station BS and the beam steering apparatus 1, searches for the signal with the highest received power, and reports the searched signal to the base station BS. The user equipment UE reports information on the signal with the highest power received through the FR1 band to the base station.

The beam steering apparatus 1 performs beam sweeping with a plurality of different beams formed by reconfiguring the meta-surface 200 (S300). In an embodiment, the base station BS steers and provides beams to correspond to the information provided through the SSB field SSB, and this process of providing beams with different steering angles is called beam sweeping. Beam sweeping is performed by the base station BS and/or the beam steering apparatus 1. Referring to FIG. 8, the signal provided by the base station BS includes an SSB field in which beam information including the beam steering angle provided by the base station BS and the beam steering apparatus 1 is provided.

In the above-described embodiment, the signals of SSB1 to SSB61 included in the SSB field include beam information including the steering angle steered and provided by the base station BS, and the signals of SSB62 to SSB64 include beam information including the steering angle steered and provided by steering the apparatus 1. As described above, the number of SSB signals including the beam information provided by the beam steering apparatus 1 may be set and stored in the base station BS.

In an embodiment, when one of the beams corresponding to SSB1 to SSB61 steered and provided by the base station BS and the beams corresponding to SSB62 to SSB64 steered and provided by the beam steering apparatus 1 is received with the highest power, the beam steering apparatus 1 reports information on the beam received with the highest power through the FR1 band. The report may be transmitted in the 5G FR1 band below 6 GHz. The base station BS steers and provides the beam according to the received beam information, and the beam steering apparatus 1 does not perform a beam steering operation.

In another embodiment, when the user terminal receives any one of the beams among SSB62 to SSB64 steered and provided by the beam steering apparatus 1 at the highest power, the user equipment UE reports information on the corresponding beam to the base station BS. The base station BS provides information about the beam to the reconfiguration field RECFG included in the subsequent control signal con, and the beam steering apparatus 1 decodes the reconfiguration field RECFG of the control signal con and steers and provides a beam to correspond to the information reported by the user equipment UE. At this time, the base station BS does not sweep the beam.

The user terminal communicates with the base station BS using one of the plurality of beams swept by the beam steering apparatus (S400). The user terminal may communicate with the base station BS through the beam steering apparatus 1, and communicate in the 5G FR2 band of the mm wave band as described above.

The information on the beam received with the highest power reported by the user terminal is provided to the base station BS as described above, and the base station BS records and transmits the information on the beam in the reconfiguration field RECFG of a beam management signal (see FIG. 8) provided periodically, whereby the user terminal may communicate with the base station using the beam received with the highest power reported immediately before.

Although the above embodiments have been described using a single user terminal as an example, in this embodiment, a plurality of user terminals are possible. As an example, a plurality of control signals con may be placed at different positions in the beam management signal so that each NR-surface is individually synchronized with the control signal con containing the identification information of each user terminal. As another example, the plurality of beam steering apparatuses 1 may operate together with a plurality of beam steering apparatuses by receiving the control signal at different frequencies.

The beam steering apparatus including the meta-surface according to this embodiment consumes only 247 μW of power. This power consumption is enough to allow the beam steering apparatus to operate for 2.1 years on a single AA battery. Therefore, the beam steering apparatus according to this embodiment has excellent performance and high energy efficiency, as will be described later.

Implementation and Experimental Examples

SNR in User Equipment UE Environment

An SNR gain according to real-time reconfiguration of the beam steering apparatus for user terminal UE mobility is estimated. FIG. 11A is a diagram illustrating an experimental environment. As illustrated in FIG. 11A, an LoS path is blocked by a corridor, and therefore the base station BS cannot support the user equipment UE without a beam steering apparatus. To improve the coverage of this user equipment UE in blind spots, the beam steering apparatus has been arranged at an intersection, and the beam steering apparatus is closely synchronized with the beam management signal and performs beam sweeping during SSB. The user equipment UE moves around the corridor along two paths in FIG. 11A, that is, a straight path having a constant distance from the beam steering apparatus while the user equipment UE moves at 1 m/s, which is the walking speed of a typical person, and an "S-curve" passing through several points at different distances from the beam steering apparatus.

Regions in FIG. 11A are colored according to the beam configuration that provides the maximum SNR based on simulated beam patterns. FIGS. 11B and 11C show dynamic SNR changes of four beams according to movement, measured once every frame (20 ms) for "linear" and "S-curve" movement paths, respectively. Specifically, a user equipment UE moving linearly passes sequentially from SSB1 to SSB4, and a user equipment UE moving in an S-curve passes in the order SSB1→SSB2→SSB3→SSB2→SSB3→SSB4. Through this movement, it is confirmed that an optimal SSB for the maximum SNR changes when the user equipment UE passes through the region and this is continuously reported to the base station BS every 20 ms. In this figure, when the best SSB is selected, it is possible to increase an SNR gain by up to 15.2 dB, which is directly correlated to the SNR of the data portion.

In the case of real-time reconfiguration, the intensity of a single fixed beam may deteriorate quickly, and thus the beam steering apparatus must be quickly reconfigured according to an optimal beam configuration change when the user equipment UE crosses a virtual boundary. FIGS. 11D and 11E are diagrams illustrating the SNR of data in every frame for "linear" and "S-curve" movement paths, respectively. The optimal beam for data transmission is determined from reports of previous beams, and these beams are transmitted through a VLoS path by a real-time reconfigured beam steering apparatus. In this figure, the colored background represents timing boundaries where the optimal SSB changes. The beam steering apparatus can be real-time reconfigured to always follow the largest SNR among SSBs.

Because fast beam changes prevent SNR degradation when the optimal beam changes, the beam steering apparatus can achieve high average SNR gains of 18.3 dB and 20.3 dB at each user equipment UE movement.

SNR in Environment where Obstacles are Changed

Figure 12A:
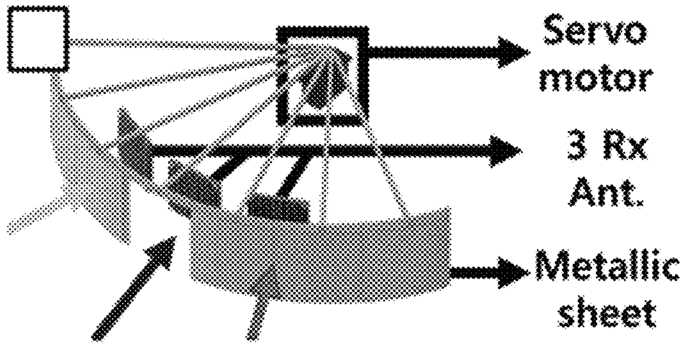
FIG. 12A illustrates a blocking setup of a user terminal with three receiving microstrip patch antennas made of metal sheets movable via a servo motor, and a, b, and c of FIG. 12B illustrate situations where the line of sight between a base station and a user terminal is blocked by a corridor.
Figure 12B:
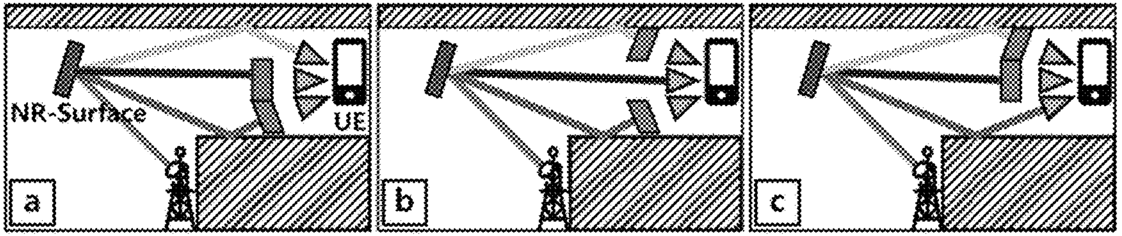
FIG. 12C is a graph showing the SNR gain of the data measured every 20 ms while rotating the servo motor.
Figure 12C:
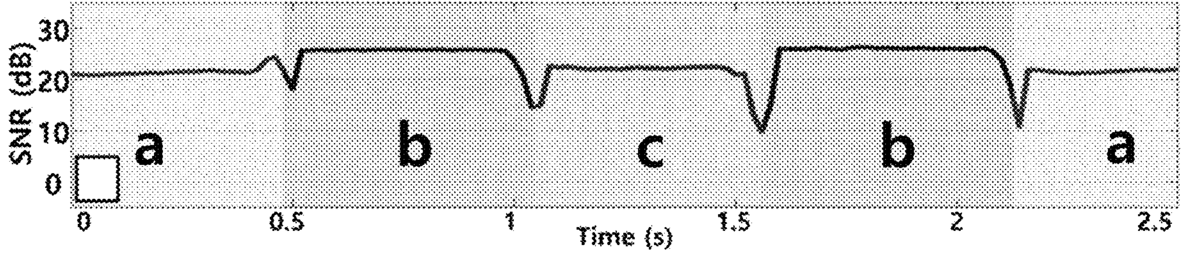

FIG. 12A illustrates a blocking setup of a user equipment UE with three receiving microstrip patch antennas made of metal sheets that can be moved via a servo motor. Three Rx antennas of the user equipment UE are each oriented in a different direction to identify the optimal beam among multiple Rx beams, and each antenna is correlated with one Rx beam of digital beamforming. For accurate evaluation, the movement of the blockage was mechanically controlled to minimize errors due to manual manipulation. When the servo motor is accurately rotated, the metal sheet always blocks the two antennas, and only one antenna was set to receive signals from the NR-Surface.

a, b, and c of FIG. 12B show a situation where the line of sight LoS between the base station BS and the user equipment UE is blocked by a corridor. In each situation, only one antenna can receive the signal and the other antennas are blocked by the metal sheet. The SNR gain of the data was measured every 20 ms while rotating the servo motor, and the results are shown in FIG. 12C. It can be seen that as the servo motor rotates, beams are provided and detected in the order of a, b, c, b, and a. From the measurement results of FIG. 12C, it can be seen that beam steering apparatus can build a high SNR path with an average SNR of 22.2 dB through fast recovery.

Operation of Multiple UEs

Figure 13A:
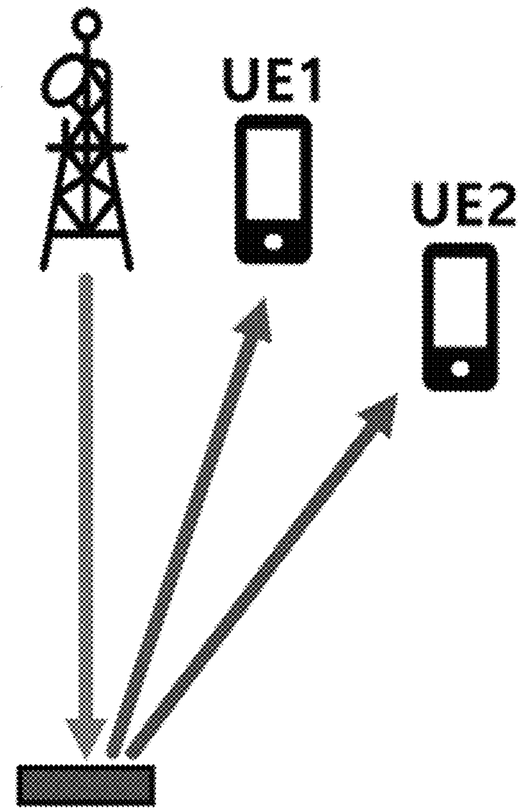
FIG. 13A is a diagram illustrating a multi-UE operation experiment.
Figure 13B:
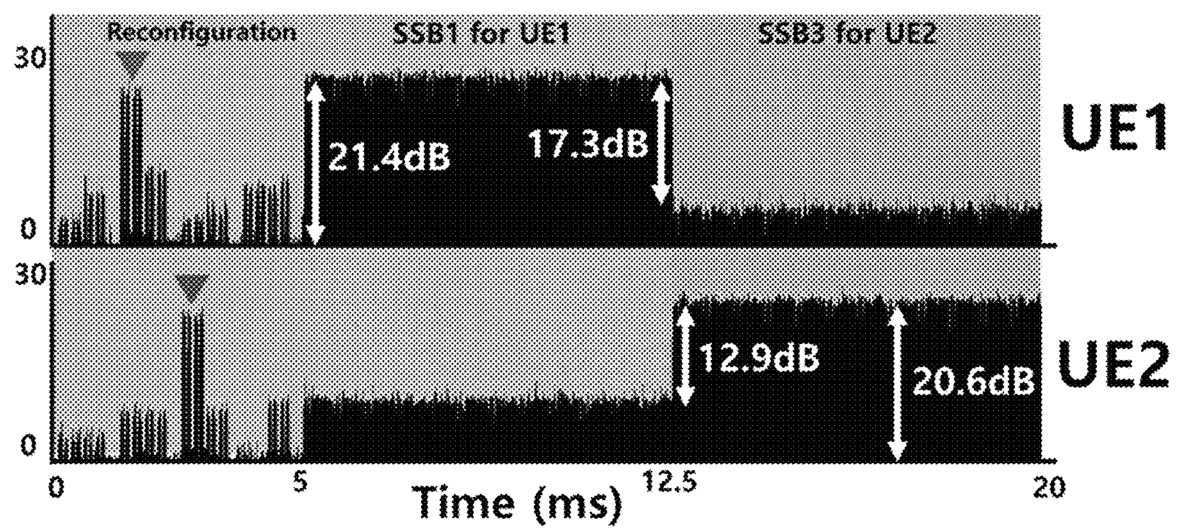
FIG. 13B is a diagram illustrating the SNR of a signal received at each user equipment UE.

FIG. 13A is a diagram illustrating an experiment on the operation of multiple user equipment UE. Referring to FIG. 13A, two UEs were set to be placed in different positions so that each user equipment UE could select a different beam for data transmission. User equipment UE1 and user equipment UE2 were scheduled to receive data between 5 ms and 12.5 ms and between 12.5 ms and 20 ms, respectively. The beam steering apparatus receives schedule information along with information about each beam. FIG. 13B is a diagram illustrating the SNR of a signal received at each user equipment UE.

During beam sweeping, the user equipment UE reports different SSBs with the best SSB indices being SSB1 and SSB3 (triangle in FIG. 13B) for the user equipment UE1 and the user equipment UE2, respectively. The beam steering apparatus is reconfigured to SSB1 at 5 ms for the user equipment UE1, allowing the user equipment UE1 to achieve +21. dB SNR during data transmission. Next, the beam steering apparatus is reconfigured at 12.5 ms to enable the user equipment UE2 to achieve +20.6 dB SNR from 12.5 ms to 20 ms. The SNR for user equipment UE1 and user equipment UE 2 is significantly better by +17.3 dB and +12.9 dB, respectively, compared to the beam steering apparatus reconfigured with only a single beam pattern from another user equipment UE.

Multi-Beam Steering Apparatus

Figure 14A:
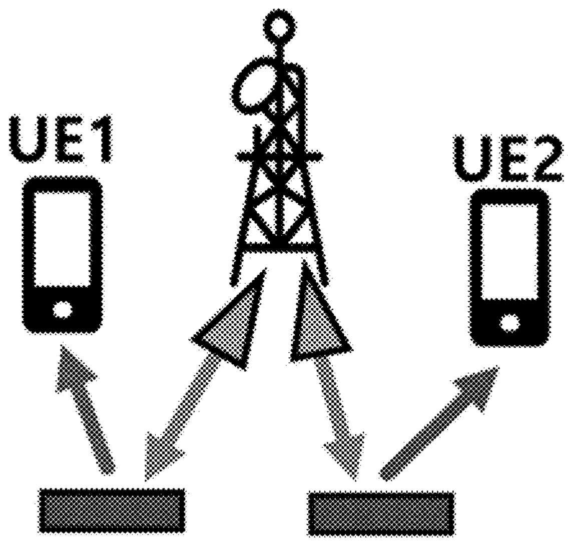
FIG. 14A is a diagram illustrating a configuration for demonstrating the operation of a multi-beam steering apparatus.

FIG. 14A is a diagram illustrating a configuration for demonstrating the operation of a multi-beam steering apparatus. Referring to FIG. 14A, two user equipment UE were placed so that each user equipment UE used a different beam steering apparatus to establish data communication to cover separate blind spots. Multiple control signals con were placed in different subframes or different guardband spectra, and each beam steering apparatus was individually synchronized and reconfigured according to each NBPU. Two fixed beam antennas were placed in the base station BS, each facing one beam steering apparatus (triangle in FIG. 14B), to emulate a large beam encompassing two beam steering apparatuses. The base station BS reconfigures its own beams and transmits the reconfigured beams individually to each beam steering apparatus.

Figure 14B:
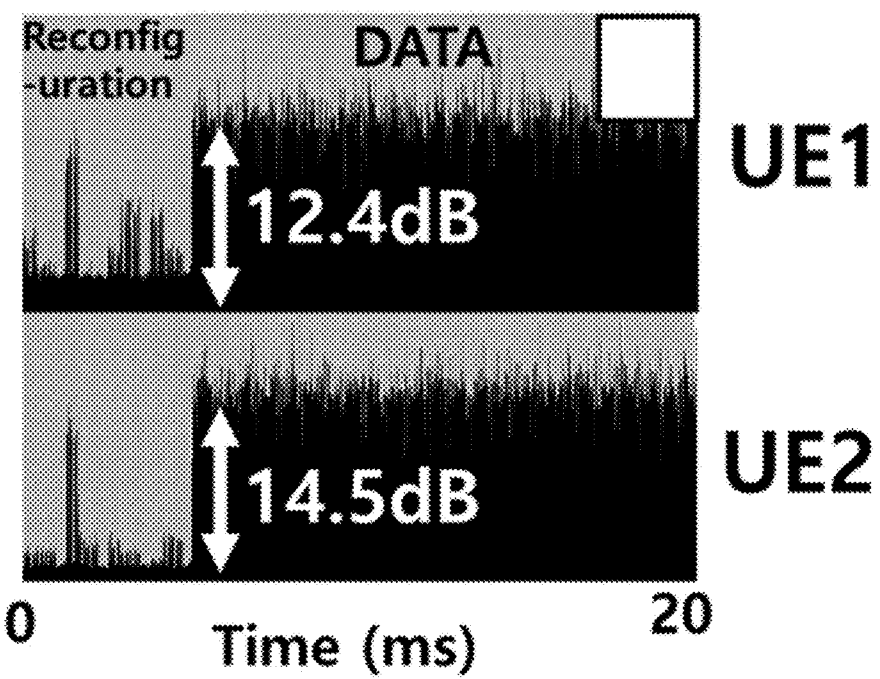
FIG. 14B is a diagram illustrating the SNR of a FR2 signal received at each UE.

FIG. 14B is a diagram illustrating the SNR of an FR2 signal received at each user equipment UE. During beam sweeping, the user equipment UE reports the best beam information (SSB index), which is SSB2 for both the user equipment UE1 and the user equipment UE2. Two separate control signals con are transmitted at different timings within the same NB-IoT spectrum and contain reconfiguration information for the beam steering apparatus 1 and the beam steering apparatus 2, respectively. Both UEs successfully achieved an average of +13.5 dB SNR. It can be seen that the multi-beam steering apparatus can successfully cover complex environments where a single beam steering apparatus cannot support user equipment UE in different blind spots.

Synchronization Performance of Beam Steering Apparatus

Figure 15:
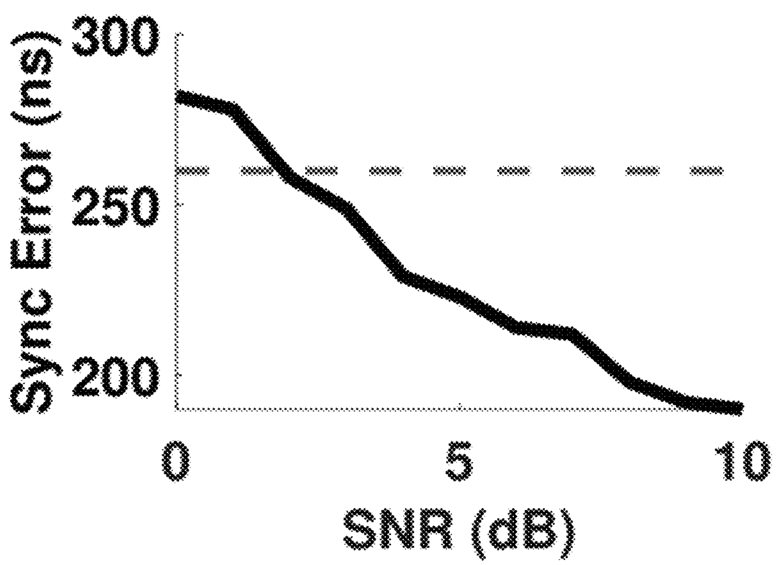
FIG. 15 is a diagram illustrating the standard deviation of synchronization errors for SNR.

FIG. 15 is a diagram illustrating the standard deviation of synchronization errors for SNR. For beam management procedures at low SNR, the beam steering apparatus must be closely synchronized with the base station BS. As described above, the beam steering apparatus using the low-speed sampling technique successfully achieved a synchronization error of less than 260 ns even at low power emulating a 4 MHz sampling rate with a low-end ADC with a 14 KHz sampling rate. The beam steering apparatus may synchronize with the base station BS at SNRs as low as +2 dB, which is sufficient for a scenario for distributing the beam steering apparatus with SNR of +12 dB.

BER Performance of Bean Steering Apparatus

Figure 16:
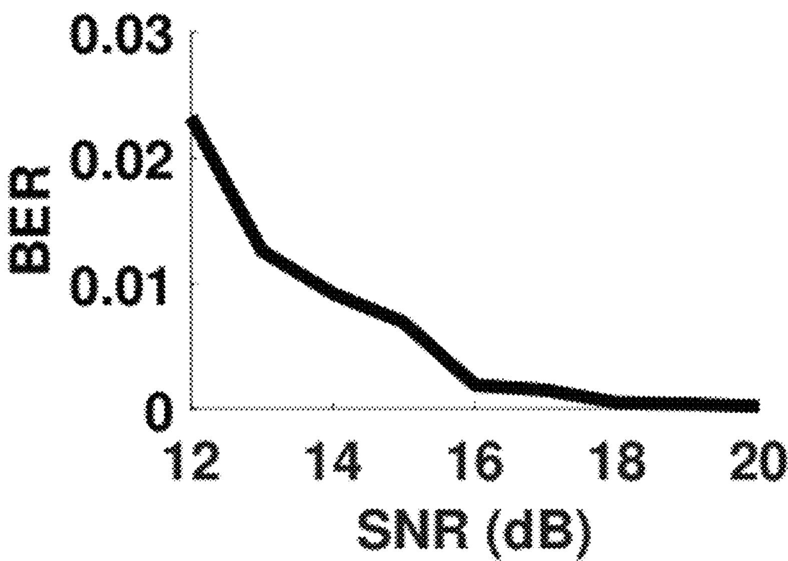
FIG. 16 is a diagram illustrating an average BER of a beam steering apparatus for SNR averaged for 10,000 symbols.

FIG. 16 is a diagram illustrating the average BER of the beam steering apparatus for SNR averaged over 10,000 symbols. The beam steering apparatus achieved <0.01 BER at +14 dB SNR. It should be noted that guardband operation causes interference in the NR spectrum. A band-pass filter used in the first stage of the front end unit successfully suppresses interference by a factor of up to 8.8 (−18 dB), making the influence of adjacent NR spectra substantially negligible.

Beam Pattern Measurement of Beam Steering Apparatus

Figure 17:
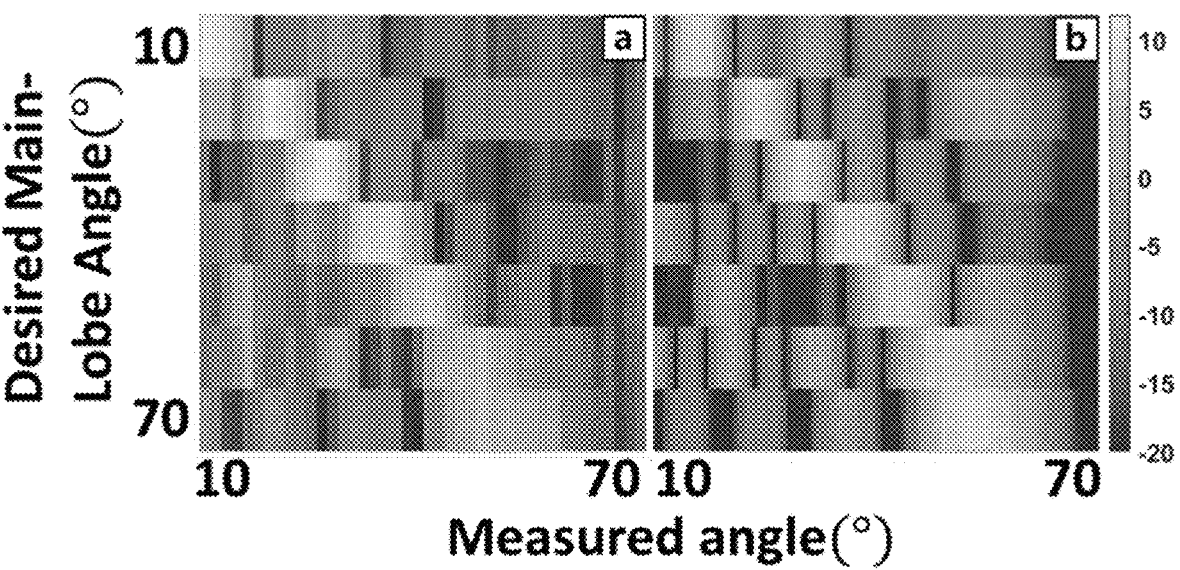
FIG. 17 is a diagram illustrating a simulated beam pattern and a measured beam pattern generated by a beam steering apparatus using a 1-bit GPIO output.

FIG. 17 illustrates a simulated beam pattern (left a) and a measured beam pattern (right b) generated in a beam steering apparatus using a 1-bit GPIO output. Power simulation and measurement results are arranged to represent a desired single beam pattern with each row desired to be steered from +100 to +70°. The measurement resolution is 2°. A power measurement matrix looks similar to the simulation, with strong diagonal lines showing that each beam pattern was successfully steered to a desired angle. The beam steering apparatus successfully covers up to 1400 from −70° to +700 using a symmetrical pattern with suppressed lateral lobes of the beam pattern.

The present invention has been described with reference to the embodiments shown in the drawings to aid understanding of the present invention, but these are embodiments for implementation and are merely illustrative, and various modifications and equivalents can be made by those skilled in the art. Therefore, the true technical protection scope of the present invention should be determined based on the appended patent claims.

[Description of reference numerals]

| | | | |
|---|---|---|---|
| 1: | Beam steering apparatus | | |
| 10: | unit cell | 12, 14: | metal plate |
| 20: | variable capacitance element | 30: | Line |
| 40: | Via | 100: | Front end unit |
| 110: | Bandpass filter | 120: | Matching circuit |
| 130: | Envelope Detector | 140: | Power Amplifier |
| 200: | Meta surface | 300: | Computation and control |

The invention claimed is:

1. A communication method using a meta-surface, the communication method comprising:

providing, by a base station, a control signal to a beam steering apparatus including a reconfigurable meta-surface;

performing, by the beam steering apparatus, time synchronization with the base station by using the control signal;

performing, by the beam steering apparatus, beam sweeping with a plurality of different beams formed by reconfiguring the meta-surface; and performing communication, by a user terminal, with the base station by using one of the plurality of beams swept by the beam steering apparatus, wherein the time synchronization, the beam sweeping, and the communication are performed periodically, wherein the control signal includes a synchronization field for time synchronization, wherein the performing of the time synchronization includes forming, by the beam steering apparatus, an envelope of the synchronization field, and sampling, by the beam steering apparatus, the envelope, and wherein the forming of the envelope and the sampling of the envelope are performed in pairs, and the envelope is sampled at a different time point for each pair.

2. The communication method of claim 1, wherein the control signal further includes a reconfiguration field for reconfiguring the meta-surface of the beam steering apparatus.

3. The communication method of claim 2, wherein the control signal is a signal according to a narrow band Internet of Things (NB-IoT) protocol and is a signal emulated with binary phase shift keying (BPSK).

4. The communication method of claim 2, wherein, upon initial boot-up of the beam steering apparatus, the performing of the time synchronization includes sampling an entirety of the synchronization field.

5. The communication method of claim 2, wherein, upon subsequent boot-up of the beam steering apparatus, the performing of the time synchronization includes sampling a highest power portion of the synchronization field.

6. The communication method of claim 1, further comprising:

reporting, by the user terminal, a synchronization signal block (SSB) of the beam received with a highest power among the plurality of beams swept and provided by the beam steering apparatus and the base station to the base station, after the performing of the beam sweeping.

7. The communication method of claim 2, wherein the reconfiguration field corresponds to information of the beam received with a highest power in the performing of the beam sweeping.

8. The communication method of claim 1, further comprising:

performing, by the base station, beam sweeping by forming different synchronization signal blocks (SSBs) for each of the plurality of different beams, wherein, in the performing of the beam sweeping by the base station, the beam steering apparatus does not perform beam steering.

9. The communication method of claim 1, wherein, in the performing of the beam sweeping, the base station provides the beam at a same angle, and the beam steering apparatus performs beam sweeping by forming different synchronization signal blocks (SSBs) while reflecting the beam provided by the base station in different directions.

10. The communication method of claim 1, wherein the providing of the control signal is conducted using a 5G FR1 band of less than 6 GHZ, and the performing of the communication is conducted using a 5G FR2 band of a mm wave band.

* * * * *